(12) United States Patent
Fletcher et al.

(10) Patent No.: US 6,968,277 B2
(45) Date of Patent: Nov. 22, 2005

(54) POWER LINE MONITORING AND INTERRUPT METHOD AND APPARATUS

(75) Inventors: David G. Fletcher, Simsbury, CT (US); Gregory P. Lavoie, Bristol, CT (US)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 10/052,236

(22) Filed: Jan. 16, 2002

(65) Prior Publication Data

US 2003/0135337 A1 Jul. 17, 2003

(51) Int. Cl.[7] .................. G01R 22/00; G01R 13/00; G01R 13/14
(52) U.S. Cl. .................. 702/60; 702/66; 324/76.15; 324/76.38
(58) Field of Search .................. 702/60, 64, 66, 702/67; 324/76.11, 76.12, 76.15, 76.19, 76.38, 522

(56) References Cited

U.S. PATENT DOCUMENTS

| | | | |
|---|---|---|---|
| 4,152,606 A | | 5/1979 | Hornak |
| 4,368,499 A | * | 1/1983 | Stifter .................. 361/90 |
| 4,694,415 A | * | 9/1987 | Hasenkopf et al. .......... 708/322 |
| 5,212,437 A | * | 5/1993 | Hescht et al. ................ 318/798 |
| 5,224,054 A | | 6/1993 | Wallis |
| 5,233,538 A | | 8/1993 | Wallis |
| 5,627,718 A | | 5/1997 | Engel et al. |
| 5,706,204 A | | 1/1998 | Cox et al. |
| 5,890,097 A | | 3/1999 | Cox |
| 6,473,013 B1 | * | 10/2002 | Velazquez et al. .......... 341/120 |

* cited by examiner

Primary Examiner—John Barlow
Assistant Examiner—Meagan S Walling
(74) Attorney, Agent, or Firm—Armstrong Teasdale LLP (57) ABSTRACT

In order to detect high-speed transients in the alternating current of a power distribution system, the rate at which the power on the distribution system is sampled is increased so that even high-speed transients are detected. The sampling rate can be increased in at least two ways. First, where a single analog-to-digital converter samples multiple lines through a multiplexer, the multiplexer is controlled to allow the converter to sample only one line at a much-increased rate. Alternatively, the sampling speed of the analog-to-digital converter (or A/D array) can be controlled and increased as needed.

30 Claims, 4 Drawing Sheets

POWER LINE MONITORING AND INTERRUPT METHOD AND APPARATUS

FIELD OF THE INVENTION

This present invention relates to the field of monitoring AC power distribution networks so that the power delivered can be metered and the network and connected equipment can be protected from dangerous events in the distribution network. More particularly, the present invention relates to the manner in which monitoring systems capture the waveforms of the electrical current, particularly high-speed transients, and use that sampled data to provide protection and metering functions. The present invention provides a method and system of capturing high-speed transients that have not been previously detected or considered in monitoring power distribution and protecting equipment connected to the power distribution system.

BACKGROUND OF THE INVENTION

The variety of electrical appliances and devices in homes, offices and industrial facilities and the demand for electrical power to operate those devices is constantly increasing. Consequently, the generation and distribution of electrical power is a major industry around the world.

As power is generated and delivered to customers, it must be metered, so that customers can be charged for the power purchased or used. Power distribution is also monitored for power surges and other dangerous events. Upon the detection of such an event, the flow of power through the distribution system may be interrupted to protect the distribution system and the equipment connected to it. Power is also monitored as it is distributed to ensure that the power generation and distribution equipment is operating properly and efficiently.

In a typical power line monitoring system, the alternating current, which is an analog signal, is periodically sampled to create data points or "snapshots" of the current at particular moments in time. These data points created by periodically sampling the current are rendered as digital data that can be analyzed to understand and even reconstruct the waveform of the alternating current. This allows the monitoring equipment to detect problems in the current flow and respond appropriately when necessary.

Under conventional sampling techniques, the current is sampled approximately 128 times during each cycle of the alternating current. Thus, for each cycle of the alternating current, data on up to 128 points in time is acquired. This equates to an interval of approximately 130 microseconds between samples.

However, the present inventors have noted there are high-speed transients, aberrations in the regular pattern of the alternating current, that last less than 130 microseconds. Consequently, such transients will never be detected by conventional monitoring equipment and techniques. However, the presence of these high-speed transients can provide valuable information about the operation of the power generation or distribution system and may also signal an event for which the flow of current should be interrupted to protect the distribution system and connected equipment.

Consequently, there is a need in the art for a method and system that allows appropriate monitoring of a power distribution line while capturing high-speed transients that have been entirely missed by prior art systems.

SUMMARY OF THE INVENTION

The present invention meets the above-described needs and others. Specifically, the present invention provides a method and system that allows appropriate monitoring of a power distribution line while capturing even high-speed transients and considering those transients in monitoring operations.

Additional advantages and novel features of the invention will be set forth in the description which follows or may be learned by those skilled in the art through reading these materials or practicing the invention. The advantages of the invention may be achieved through the means recited in the attached claims.

The present invention may be embodied and described as a method of monitoring a power distribution system by increasing a sampling rate for sampling analog monitoring signals from monitoring of the power distribution system until the sampling rate is high enough to capture high-speed transients. Preferably, the monitoring signals are indicative of both current and voltage parameters within lines of the power distribution system.

The method may proceed and include storing sampled data from the monitoring signals in a memory unit; and analyzing the stored data with a processor. After analysis, the method may include displaying sampled data, including detected high-speed transients, on a monitor. In the event of danger, the method may include interrupting a flow of power on the power distribution system.

The sampling rate may be increased in response to user input from a user input device. Alternatively, increasing the sampling rate may be performed automatically as part of a monitoring routine for the power distribution system.

The method of increasing the sampling rate may include sampling the monitoring signals by multiplexing the monitoring signals to an analog-to-digital converter, and increasing the sampling rate by controlling the multiplexing of the monitoring signals to provide a single monitoring signal to the analog-to-digital converter for an extended time such that a sampling rate for that monitoring signal is increased high enough to capture high-speed transients in that monitoring signal.

Alternatively, the method of increasing the sampling rate may include controlling a sampling rate of one or more analog-to-digital converters, where each of the one or more analog-to-digital converters has a variable sample rate and receives a particular monitoring signal.

The present invention is not restricted to the foregoing method, but also encompasses any number of systems for performing the method outlined above and variations thereof. For example, in one embodiment, the present invention may provide a system for monitoring a power distribution line having: connections for individual lines in the power distribution line for providing monitoring signals indicative of current and voltage within the lines of the power distribution line; and at least one analog-to-digital converter for sampling the monitoring signals, where the converter samples a monitoring signal fast enough to capture high-speed transients.

Such a system may further include a multiplexer for multiplexing the monitoring signals to the analog-to-digital converter; and a processor controlling the multiplexer. The processor may cause the multiplexer to provide a particular monitoring signal to the analog-to-digital converter long enough for the analog-to-digital converter to capture high-speed transients in the particular monitoring signal. A user input device connected to the processor may be used to control the processor's operation of the multiplexer.

In an alternate embodiment, the analog-to-digital converter may be an array of analog-to-digital converters, each receiving a particular monitoring signal and each having a variable sampling rate. The processor may then control the sampling rate of the analog-to-digital converters to at least periodically increase the sampling rate enough to capture high-speed transients. A user input device connected to the processor may be used to control the processor's operation of the analog-to-digital converter array.

The system may also include an interrupt device for selectively halting power flow in the power distribution system.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Throughout the drawings, identical elements are designated by identical reference numbers.

DETAILED DESCRIPTION OF THE PREFERRED EMBODIMENTS

In order to detect high-speed transients in the alternating current of a power distribution system, the rate at which the power on the distribution system is sampled is increased so that even high-speed transients are detected. The sampling rate can be increased in at least two ways. First, where a single analog-to-digital converter samples multiple lines through a multiplexer, the multiplexer is controlled to allow the converter to sample only one line at a much-increased rate. Alternatively, the sampling speed of the analog-to-digital converter (or A/D array) can be controlled and increased as needed.

Using the drawings, the preferred embodiments of the present invention will now be explained.

Figure 1:
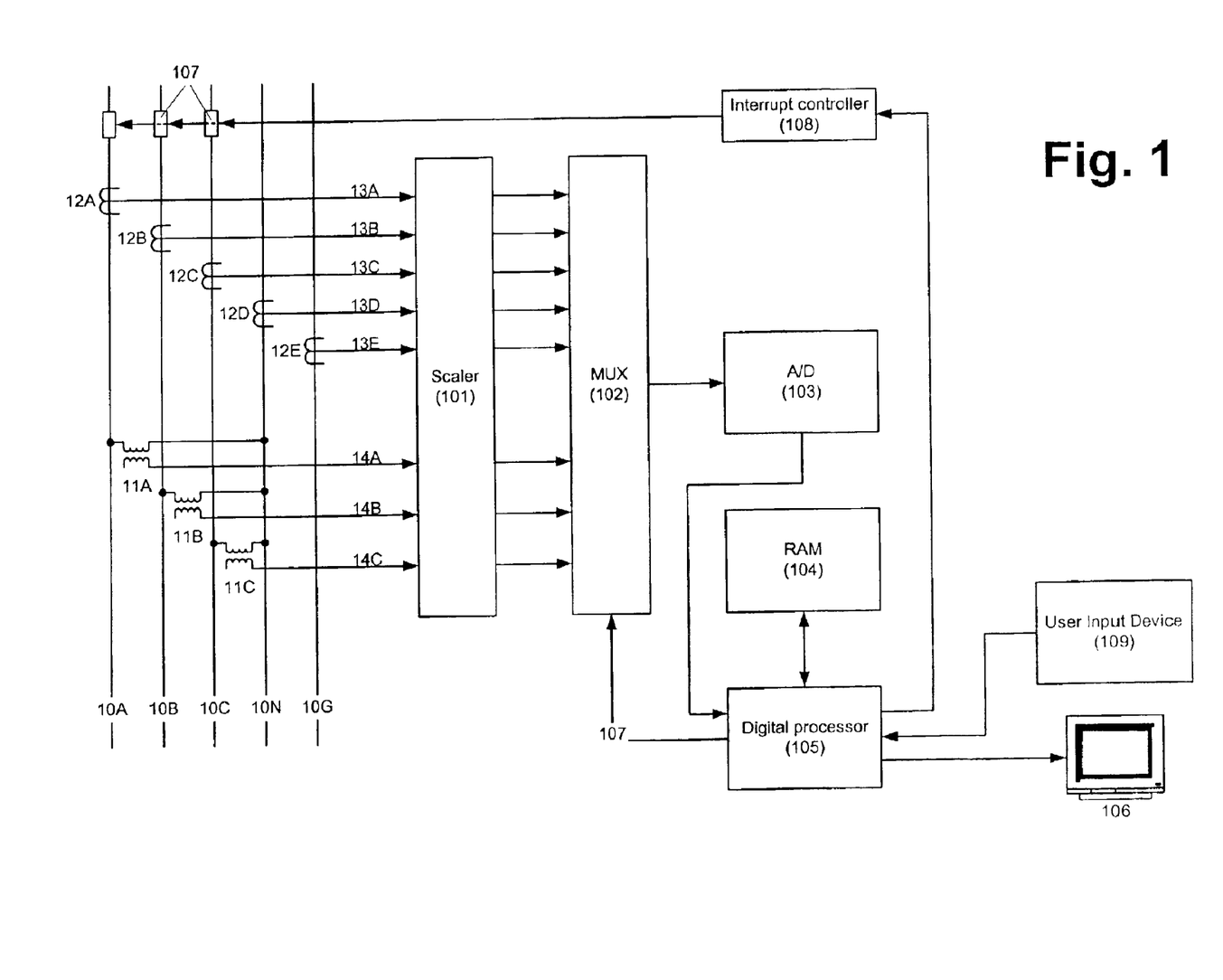
FIG. 1 is a block diagram of a preferred power distribution monitoring system with the capability to capture even high-speed transients according to the present invention.

FIG. 1 is a block diagram of a preferred power distribution monitoring system with the capability to capture even high-speed transients according to the present invention. As shown in FIG. 1, the power distribution system may include five lines (10). Three of the lines (10A, 10B and 10C) are power lines. Line (10N) is a neutral line, and line (10G) is a ground line. However, it will be understood that a different number or configuration of lines may be used to compose the power distribution system.

In the example of FIG. 1, the three power lines (10A, 10B and 10C) each incorporate a controlled interrupt or circuit breaker (107). These interrupts (107) may be switches, fuses or the like and are preferably controlled by a signal from an interrupt controller (108). Thus, when an event occurs on the power lines (10A, 10B or 10C) that warrants interrupting the flow of power, the interrupt controller (108) will provide a trip signal to the interrupts (107). The trip signal will cause the interrupts to open thereby preventing further power flow along the lines (10A, 10B and 10C). This will protect the power distribution system (10) and any electrical equipment connected thereto. Preferably, the interrupts (107) can then be reset and power distribution restarted.

The remainder of FIG. 1 illustrates a monitoring system that is connected to the power distribution system (10) and can detect conventional fundamental cycles, several harmonics and even high-speed transients. For purposes of this discussion, and in the appended claims, a high-speed transient is a transient that would not be captured by traditional monitoring techniques at traditional sampling rates. For example, a high-speed transient may be defined as a transient with a duration less than 130 $\mu$s (microseconds).

As shown in FIG. 1, the monitoring system includes lines (13) for measuring the current on any of the lines of the power distribution system (10). Each such current sampling line (10) preferably includes a sensor, typically a current transformer, (12) through which that line (10) passes. Consequently, the current in a line (10) will cause a signal in the current transformer (12) through which it passes that is indicative of the current level in the line (10). Thus, the current on the line (10) can be monitored without diverting or diminishing the current itself.

Transformer (12A) is positioned around the first power line (10A) and sends a signal over line (13A) indicative of the amount of current flowing through line (10A). Transformer (12B) is positioned around the second power line (10B) and sends a signal over line (13B) indicative of the amount of current flowing through line (10B). Transformer (12C) is positioned around the third power line (10C) and sends a signal over line (13C) indicative of the amount of current flowing through line (10C). Transformer (12D) is positioned around the neutral line (10N) and sends a signal over line (13D) indicative of the amount of current, if any, flowing through the neutral line (10N). Transformer (12E) is positioned around the ground line (10G) and sends a signal over line (13E) indicative of the amount of current, if any, flowing through the ground line (10G).

In addition to the lines (13) for monitoring current in the power distribution system (10), there are lines (14) for monitoring the voltage on each line of the power distribution system (10). In the example of FIG. 1, each of these lines (14) includes a voltage transformer (11) that measures the voltage between each of the power lines (10A, 10B, 10C) of the power distribution system and the neutral line (10N). It will be understood that, within the scope of the present invention, the voltage transformers (11) could each be replaced with resistors or other circuit elements capable of detecting a voltage differential.

A first voltage transformer (11A) is connected between the first power line (10A) and the neutral line (10N) and outputs a signal indicative of the voltage difference between the first power line (10A) and the neutral line (10N). A second voltage transformer (11B) is connected between the second power line (10B) and the neutral line (10N) and outputs a signal indicative of the voltage difference between the second power line (10B) and the neutral line (10N). A third voltage transformer (11C) is connected between the third power line (10C) and the neutral line (10N) and outputs a signal indicative of the voltage difference between the third power line (10C) and the neutral line (10N).

The current monitoring lines (13) and the voltage monitoring lines (14) each feed into a scaler (101). The scaler (101), an analog circuit, scales or level shifts the signals, if necessary, so that the signals can be meaningfully processed by the remainder of the monitoring system.

After the current and voltage monitoring signals have been scaled, they are provided to a multiplexer (102) which multiplexes the signals into an analog-to-digital ("A/D") converter (103). During typical operation, the multiplexer will sequentially feed each of the incoming signals to the A/D converter (103) for sampling.

The A/D converter (103) samples the signal received from the multiplexer by converting the instantaneous value of the incoming signal into a digital data point. The digital data points created by the sampling are transmitted to the digital processor (105) which reads them and then stores them in a memory unit (104). In FIG. 1, the memory unit (104) is a Random Access Memory (RAM) unit.

A digital processor (105) reads the sampled data points from the memory unit (104) and analyzes those data points to identify problems occurring with the power generation or transmission equipment. The processor (105) may identify a dangerous event that should result in signaling the interrupt controller (108) to open the interrupts (107) and stop the flow of power. The pre-defined parameters that define a "dangerous event" which should result in the interruption of power flow are known in the prior art. The processor (105) may also identify less critical events in the power flow that indicate potential problems or inefficiencies with the power generation or distribution equipment.

The processor (105) preferably outputs a user interface to a monitor (106). The user interface provides a user with the processor's analysis of the power flow through the distribution system (10). The user interface displayed on the monitor (106) may be graphic or may have graphic and textual elements. The interface may also include audible alert or warning signals that can be produced by devices connected to or incorporated in the monitor (106). The monitor (106) can be located remote from the remainder of the monitoring system of FIG. 1.

During normal operation, the multiplexer will sequentially connect the A/D converter (103) with each of the input lines (13, 14). Thus, the A/D converter (103) monitors all of the lines (10) of the power distribution system by sampling data from each line (10) in turn. However, the sampling of any one line (e.g., 10A) is at a rate far below the converter's actual sampling capacity as the converter (103) is also spending time sampling a number of other lines (e.g., 10B, 10C, 10N, 10G).

Under the principles of the present invention, the A/D converter (103) can be used to sample for high-speed transients by halting the periodic sampling of all the lines (10) and sampling only a single line (e.g., 10A) at the full sample rate of the converter (103). To affect this, the processor (105) emits a signal (107) that controls the multiplexer (102) to maintain the connection between the A/D converter (103) and a single input signal or input signals from a single line (e.g., 10A). With the A/D converter (103) sampling only a single source, the sampling is at a rate fast enough to detect even high-speed transients that may be occurring.

The processor (105) can control (107) the multiplexer (102) to cycle through the various input lines (13, 14) so that a heightened scrutiny of each line for high-speed transients occurs on a regular basis during routine multiplexed monitoring of the system (10). In this way, high-speed transients on any of the lines (10) can be detected and identified by the processor (105) using the stored data points in the memory unit (104).

The processor (105) can be programmed to periodically perform the heightened sampling of the various lines (10) in the system for high-speed transients. This heightened sampling can be a part of the processor's regular monitoring routine. Alternatively, the heightened sampling can be manually controlled and only initiated upon user command.

To this end, a user input device (109) may be connected to the processor (105). The user input device (109) may be, but need not be, located with the monitor (106). The user input device (109) may be a keyboard, a mouse, a switch, a button or any other device that can be actuated by a user to signal the processor (105) to initiate heightened sampling. The signal from the user input device (109) may specify to the processor (105) which line or lines (10) are to receive heightened sampling. Alternatively, the signal from the user input device (109) may merely initiate a cycle of heightened sampling for each of the lines (10) in the distribution system.

Figure 2:
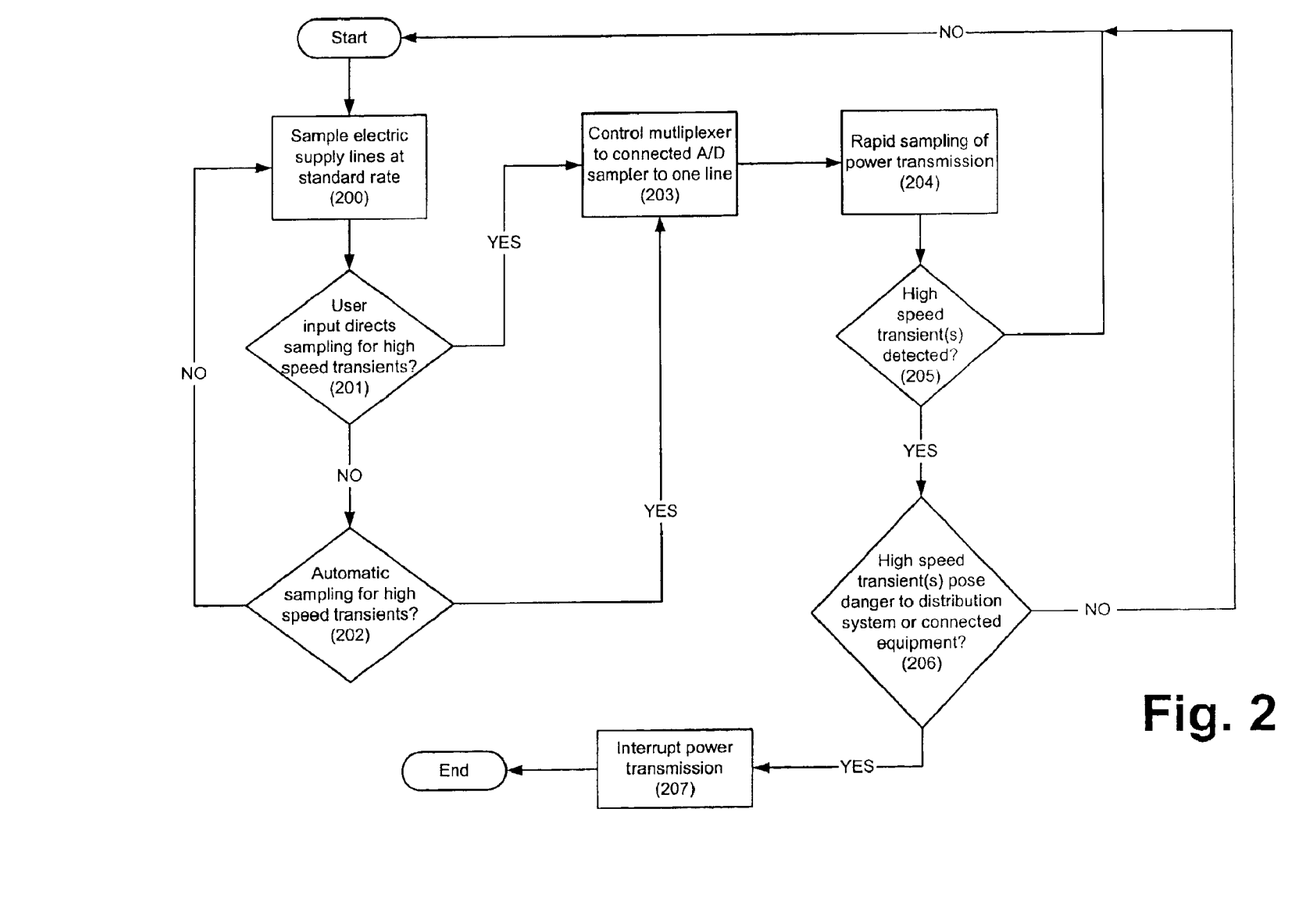
FIG. 2 is a flow chart illustrating a preferred method of monitoring a power distribution system and capturing high-speed transients according to the present invention. This method may be implemented, for example, in the system of FIG. 1.

FIG. 2 is a flow chart illustrating a preferred method of monitoring a power distribution system and capturing high-speed transients according to the present invention. This method may be implemented, for example, in the system of FIG. 1.

As shown in FIG. 2, the method begins with the sampling of electric supply lines at a standard rate (200). Next, a user may signal the system controller to begin heightened sampling to detect high-speed transients (201) as described above. If not, the system may be programmed to periodically undertake a cycle of heightened sampling for high-speed transients automatically (202).

Once heightened or rapid sampling is initiated, a multiplexer or other routing device is controlled to maintain a connection between an A/D converter (that normally samples multiples signals in sequence) and an input signal that is to be subjected to the heightened sampling (203). The A/D converter or other sampling unit will then naturally perform a rapid or heightened sampling of the incoming input signal (204).

With the rapid sampling of the input signal, high-speed transients will be captured and will no longer occur between samples. If no high-speed transients are detected (205), the system continues to operate without interruption. However, if high-speed transients are detected (205), they may be analyzed to determine if any danger is posed to the system or equipment connected to the system (206). If not, the system continues to operate without interruption. If a problem is indicated, however, the transmission of power may be interrupted (207).

Figure 3:
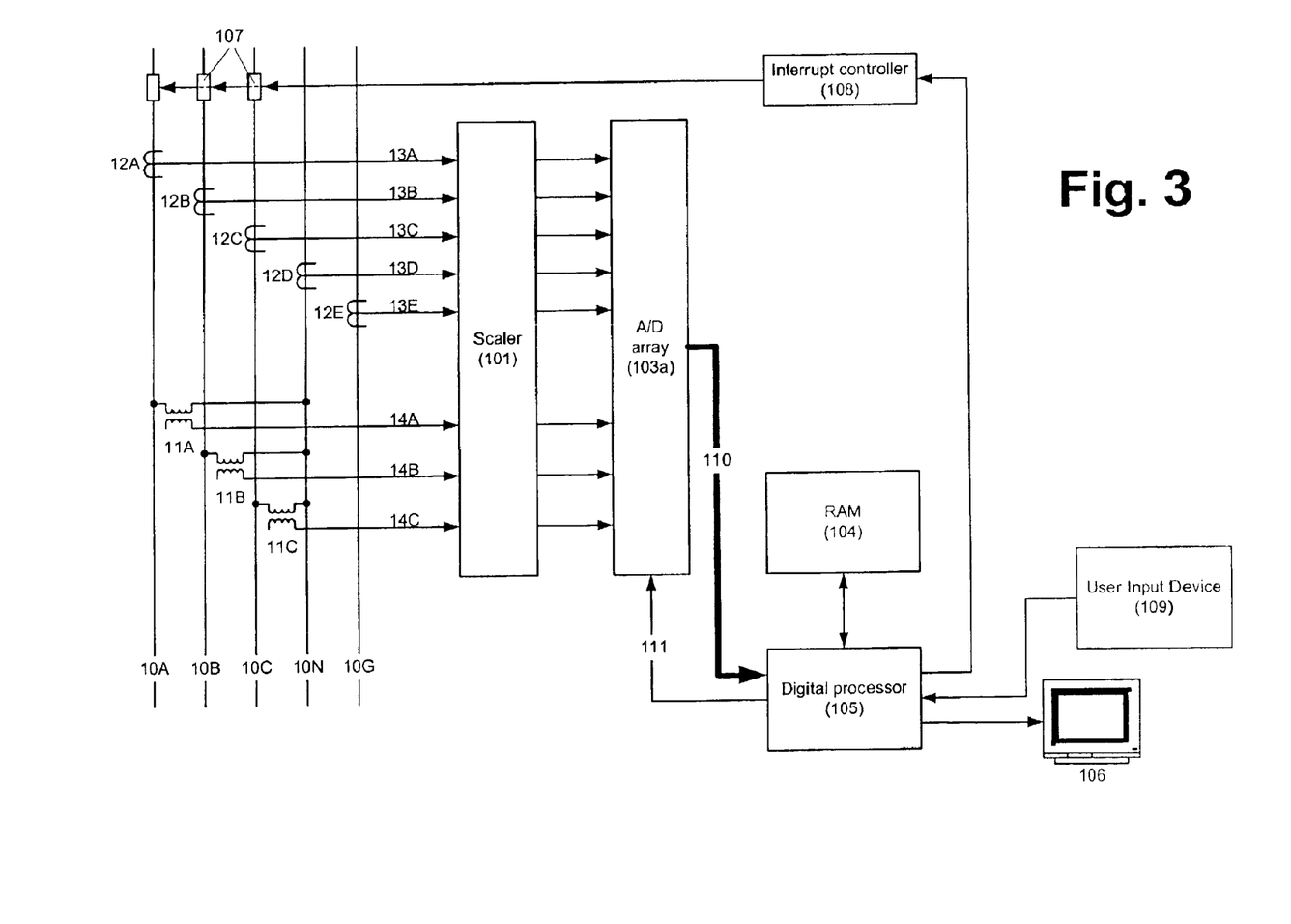
FIG. 3 is a block diagram of a second preferred embodiment of a power distribution monitoring system with the capability to capture even high-speed transients according to the present invention.

FIG. 3 is a block diagram of a second preferred embodiment of a power distribution monitoring system with the capability to capture even high-speed transients according to the present invention. The embodiment of FIG. 3 is, in many respects, identical to that of FIG. 1. Consequently, a redundant description of identical functions and elements will be omitted.

In the embodiment of FIG. 3, the scaler (101) does not output scaled signals to a multiplexer. Rather, an array of analog-to-digital ("A/D") converters (103a) is provided. Consequently, each monitoring line (13, 14) is connected through the scaler (101) to a dedicated A/D converter in the array (103a).

Each converter in the array (103a) samples the signal provided at a standard rate. However, this rate is well below the maximum capacity of the converter and can be controlled.

The individual converters in the array (103a) are connected by a bus (110) to the digital processor (105). Thus, the sampled data generated by the converters of the array (103a) can be read by the processor (105) and stored in the memory unit (104) for further analysis.

The processor (105) controls the converter array (103a) with a control signal (111). This control signal (111) can designate any converter or group of converters in the array (103a) and control the sampling rate of that converter or group of converters. In this way, the processor (105) can raise the sampling rate of any converter or group of converters in the array (103a) to a rate that will capture even high-speed transients.

The processor (105) can be programmed to periodically perform the heightened sampling of the various lines (10) in the system for high-speed transients by upping the sampling rate of the converters in the array (103a). This heightened sampling can be a part of the processor's regular monitoring routine. Alternatively, the heightened sampling can be manually controlled and only initiated upon user command.

To this end, the user input device (109) may be connected to the processor (105). As before, the user input device (109) may be, but need not be, located with the monitor (106) and may be a keyboard, a mouse, a switch, a button or any other device that can be actuated by a user to signal the processor (105) to initiate heightened sampling. The signal from the user input device (109) may specify to the processor (105) which line or lines (10) are to receive heightened sampling. Alternatively, the signal from the user input device (109) may merely initiate heightened sampling for each of the lines (10) in the distribution system.

Figure 4:
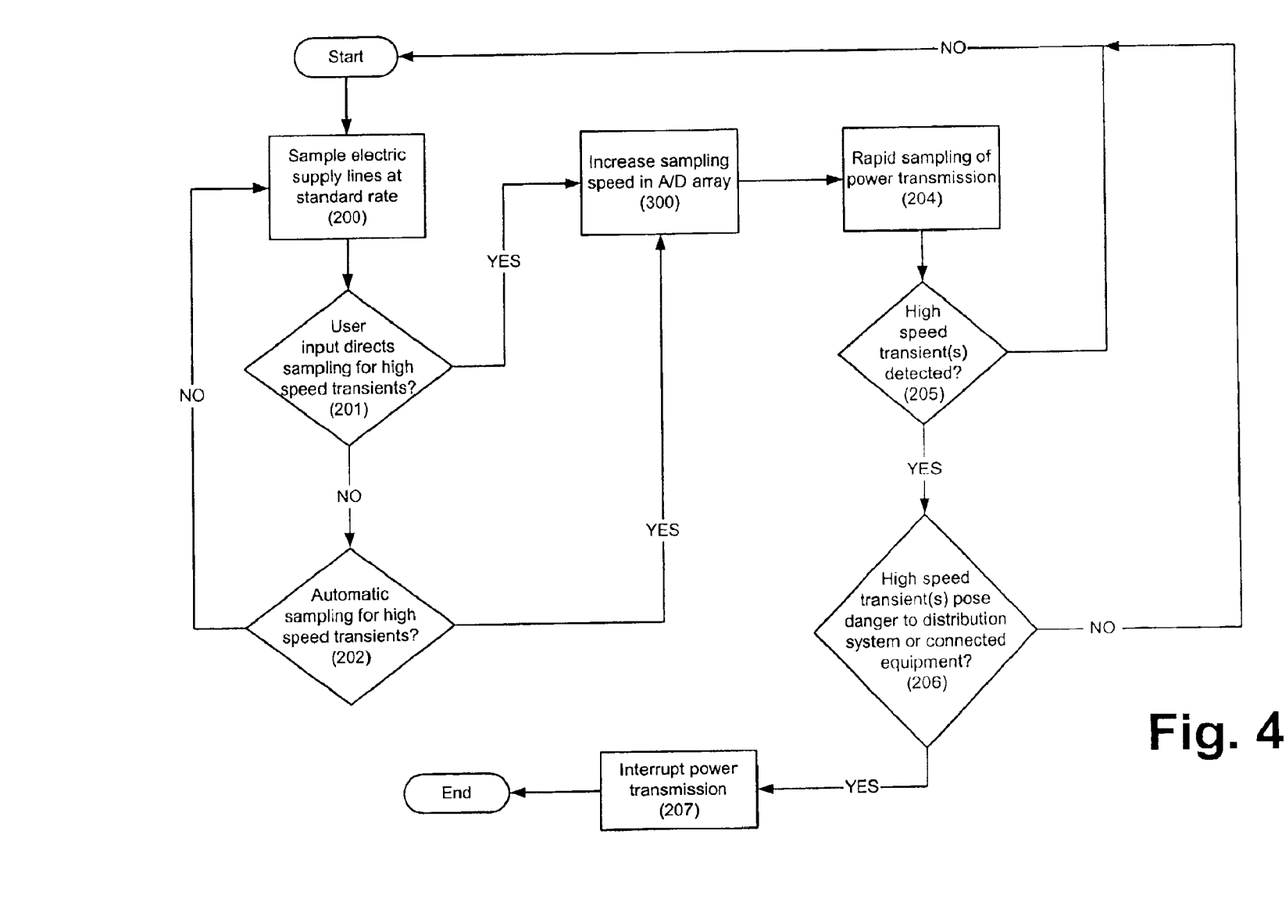
FIG. 4 is a flow chart illustrating a second preferred method of monitoring a power distribution system and capturing high-speed transients according to the present invention. This method may be implemented, for example, in the system of FIG. 3.

FIG. 4 is a flow chart illustrating a second preferred method of monitoring a power distribution system and capturing high-speed transients according to the present invention. This method may be implemented, for example, in the system of FIG. 3.

As shown in FIG. 4, the method begins with the sampling of electric supply lines at a standard rate (200). Next, a user may signal the system controller to begin heightened sampling to detect high-speed transients (201) as described above. If not, the system may be programmed to periodically undertake a cycle of heightened sampling for high-speed transients automatically (202).

Once heightened or rapid sampling is initiated, the sampling speed of one or more of the A/D converters in an A/D array is increased to a level at which high-speed transients can be captured. The A/D converters or other sampling units will then perform a rapid or heightened sampling of the incoming input signals (204).

With the rapid sampling of the input signal or signals, high-speed transients will be captured and will no longer occur between samples. If no high-speed transients are detected (205), the system continues to operate without interruption. However, if high-speed transients are detected (205), they may be analyzed to determine if any danger is posed to the system or equipment connected to the system (206). If not, the system continues to operate without interruption. If a problem is indicated, however, the transmission of power may be interrupted (207).

Another possibility, under the principles of the present invention, for increasing the sampling rate of a particular power line in a distribution system to detect high speed transients includes sampling one of the power lines at an increased rate while the other lines are sampled at the normal rate. For example, if one wished to sample line "2" at an increased rate to look for high speed transients, line 2 could be sampled at every other sampling while the other lines are sampled in rotation. Thus, the sampling system could sample lines in the following order: line 1, line 2, line 3, line 2, line 4, line 2, line 5, line 2 . . . line 1, line 2, line 3, line 2 . . . .

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of monitoring a power distribution system, said method comprising increasing a sampling rate for sampling analog monitoring signals from monitoring of said power distribution system until said sampling rate is high enough to capture high-speed transients wherein said increasing a sampling rate for sampling analog monitoring signals from monitoring of said power distribution system further comprises a first mode of sequentially sampling each of a plurality of lines of said power distribution system, and a second mode of controlling the sampling to discontinue sequential sampling of the plurality of lines and increase sampling of a particular line of the plurality of lines in said power distribution system to detect high speed transients, returning to sequential sampling of each of a plurality of lines when no high speed transients are detected.

2. The method of claim 1, further comprising monitoring both current and voltage parameters within lines of said power distribution system to generate said analog monitoring signals.

3. The method of claim 1, further comprising: storing sampled data from said monitoring signals in a memory unit; and analyzing said stored data with a processor.

4. The method of claim 3, further comprising displaying sampled data, including detected high-speed transients, or data derived from said sampled data on a monitor.

5. The method of claim 3, further comprising interrupting a flow of power on said power distribution system if analysis of said stored data indicates a danger according to predefined parameters.

6. The method of claim 1, wherein said increasing said sampling rate further comprises increasing said sampling rate in response to user input from a user input device.

7. The method of claim 1, wherein said increasing said sampling rate further comprises automatically increasing said sampling rate as part of a monitoring routine for said power distribution system.

8. A method of monitoring a power distribution system, said method comprising increasing a sampling rate for sampling analog monitoring signals from monitoring of said power distribution system until said sampling rate is high enough to capture high-speed transients, wherein said increasing a sampling rate for sampling analog monitoring signals from monitoring of said power distribution system further comprises taking every other sample from a particular line of said power distribution system.

9. The method of claim 8, further comprising sampling said monitoring signals by multiplexing said monitoring signals to an analog-to-digital converter; wherein said increasing said sampling rate comprises controlling multiplexing of said monitoring signals to provide a single monitoring signal to said analog-to-digital converter for an extended time such that a sampling rate for that monitoring signal is increased high enough to capture high-speed transients in that monitoring signal.

10. The method of claim 8, further comprising: storing sampled data from said monitoring signals in a memory unit; and analyzing said stored data with a processor.

11. The method of claim 8, further comprising displaying sampled data, including detected high-speed transients, or data derived from said sampled data on a monitor.

12. The method of claim 8 further comprising interrupting a flow of power on said power distribution system if analysis of said stored data indicates a danger according to pre-defined parameters.

13. The method of claim 8, wherein said increasing said sampling rate further comprises increasing said sampling rate in response to user input from a user input device.

14. The method of claims 8, wherein said increasing said sampling rate further comprises automatically increasing said sampling rate as part of a monitoring routine for said power distribution system.

15. A method of monitoring a power distribution system comprising:
connecting each line in a power distribution system to a dedicated analog-to-digital converter in an array of analog-to-digital converters for providing monitoring signals indicative of current and voltage within the lines of the power distribution line;
controlling the sampling rate of each of the analog-to-digital converters in the array of analog-to-digital converters to at least periodically increase the sampling rate of at least one of the analog-to-digital converters to capture high-speed transients.

16. The method of claim 15, further comprising controlling an interrupt device for selectively halting power flow in said power distribution system if analysis of said stored data indicates a danger according to pre-defined parameters.

17. The method of claim 15, controlling a group of analog-to-digital converters in the array to periodically increase the sampling rate of the group of analog-to-digital converters enough to capture high-speed transients.

18. A system for monitoring a power distribution line, said system comprising:
connections for individual lines in said power distribution line for providing monitoring signals indicative of current and voltage within the lines of said power distribution line;
at least one analog-to-digital converter for sampling said monitoring signals, said converter sampling a monitoring signal fast enough to capture high-speed transients;
a processor for controlling a first mode of sequential sampling of each of the plurality of lines by the analog-to-digital converter of said power distribution system, and for controlling a second mode of discontinuing sequential sampling of the plurality of lines and increasing the sampling of a particular line of the plurality of lines to detect high speed transients, and controlling the sampling to return to sequential sampling of each of the plurality of lines when no high speed transients are detected.

19. The system of claim 18, further comprising:
a multiplexer for multiplexing said monitoring signals to said analog-to-digital converter; and
a processor controlling said multiplexer, wherein said processor causes said multiplexer to provide a particular monitoring signal to said analog-to-digital converter long enough for said analog-to-digital converter to capture high-speed transients in said particular monitoring signal.

20. The system of claim 19, further comprising a user input device connected to said processor, wherein said processor controls said multiplexer in accordance with user input from said user input device.

21. The system of claim 18, further comprising an interrupt device for selectively halting power flow in said power distribution system if analysis of said stored data indicates a danger according to pre-defined parameters.

22. A system for monitoring a power distribution system, said system comprising:
sampling means for sampling analog monitoring signals from monitoring of said power distribution system; and
means for selectively increasing a sampling rate of said sampling means until said sampling rate is high enough to capture high-speed transients;
wherein said means for selectively increasing a sampling rate of said sampling means further comprises a first mode of sequentially sampling each of a plurality of lines of said power distribution system, and a second mode of controlling the sampling to discontinue sequential sampling of the plurality of lines and increase sampling of a particular line of the plurality of lines in said power distribution system to detect high speed transients, returning to sequential sampling of each of a plurality of lines when no high speed transients are detected.

23. The system of claim 22, further comprising:
means for storing sampled data from said monitoring signals in a memory unit; and
means for analyzing said stored data with a processor.

24. The system of claim 22, further comprising means for interrupting a flow of power on said power distribution system if analysis of said stored data indicates a danger according to pre-defined parameters.

25. The system of claim 22, further comprising user input means for controlling said means for increasing said sampling rate.

26. The system of claim 22, wherein said sampling means further comprise means for multiplexing said monitoring signals to an analog-to-digital converter.

27. The system of claim 26, wherein said means for multiplexing said monitoring signals are controlled by control means to provide a single monitoring signal to said analog-to-digital converter for an extended time such that a sampling rate for that monitoring signal is increased high enough to capture high-speed transients in that monitoring signal.

28. The system of claim 22, wherein said means for increasing said sampling rate further comprises means for controlling a sampling rate of one or more analog-to-digital converters receiving said monitoring signals, where each of said one or more analog-to-digital converters has a variable sample rate.

29. A system for monitoring a power distribution line, said system comprising:
a plurality of analog-to-digital converters comprising an array of analog-to-digital converters, each receiving a particular monitoring signal; said analog-to-digital converters each having a variable sampling rate; and
a processor for controlling the sampling rate of said analog-to-digital converters to at least periodically increase the sampling rate of at least one of the analogto-digital converters in the array enough to capture high-speed transients, further comprising an interrupt device for selectively halting power flow in said power distribution system if analysis of said stored data indicates a danger according to pre-defined parameters.

30. A system for monitoring a power distribution line, said system comprising:

a plurality of analog-to-digital converters comprising an array of analog-to-digital converters, each receiving a particular monitoring signal; said analog-to-digital converters each having a variable sampling rate; and a processor for controlling the sampling rate of said analog-to-digital converters to at least periodically increase the sampling rate of at least one of the analog-to-digital converters in the array enough to capture high-speed transients, wherein the processor at least periodically increases the sampling rate of a group of analog-to-digital converters in the array enough to capture high-speed transients.

* * * * *